July 18, 1944.  A. K. GROWALD  2,354,114
AIRCRAFT GUN INSTALLATION
Filed March 4, 1941  3 Sheets-Sheet 1

HENRY K. GROWALD.
INVENTOR.

BY
ATTORNEY.

July 18, 1944.  A. K. GROWALD  2,354,114
AIRCRAFT GUN INSTALLATION
Filed March 4, 1941  3 Sheets-Sheet 2
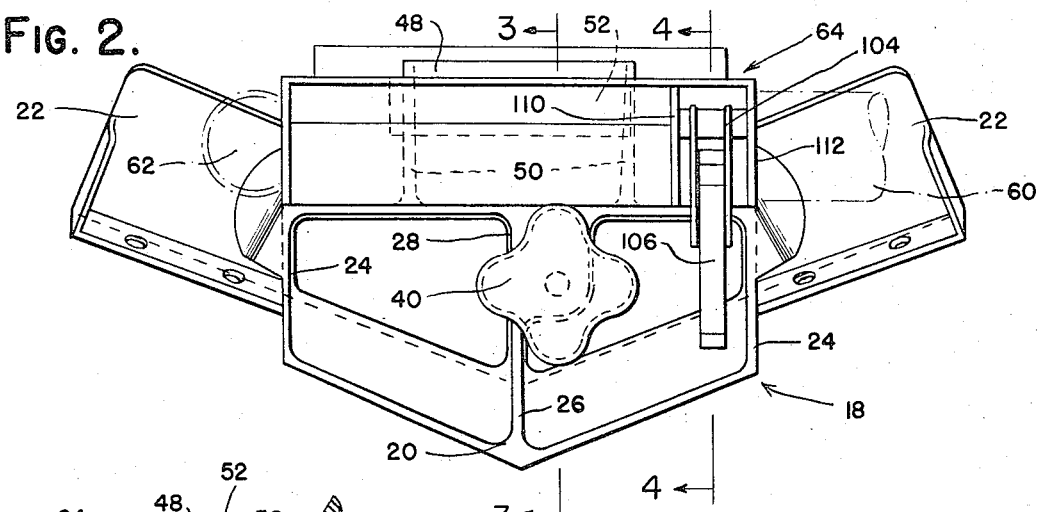
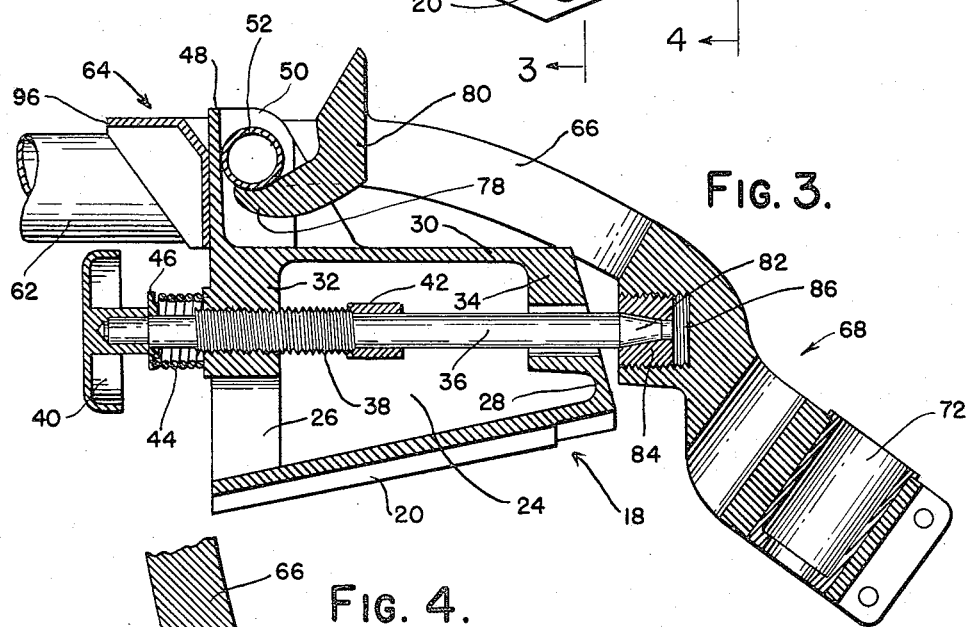
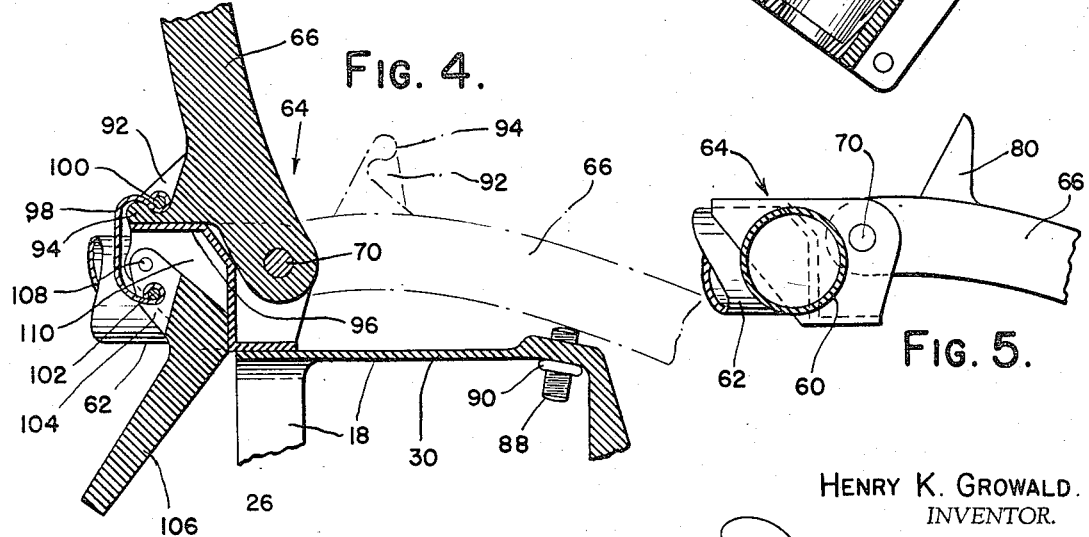
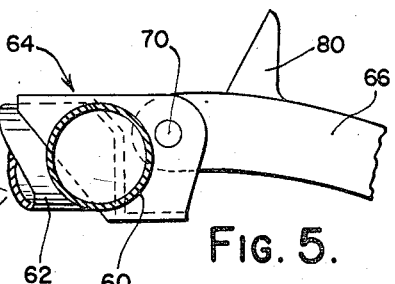
HENRY K. GROWALD.
INVENTOR.
BY Jane M. Clark
ATTORNEY

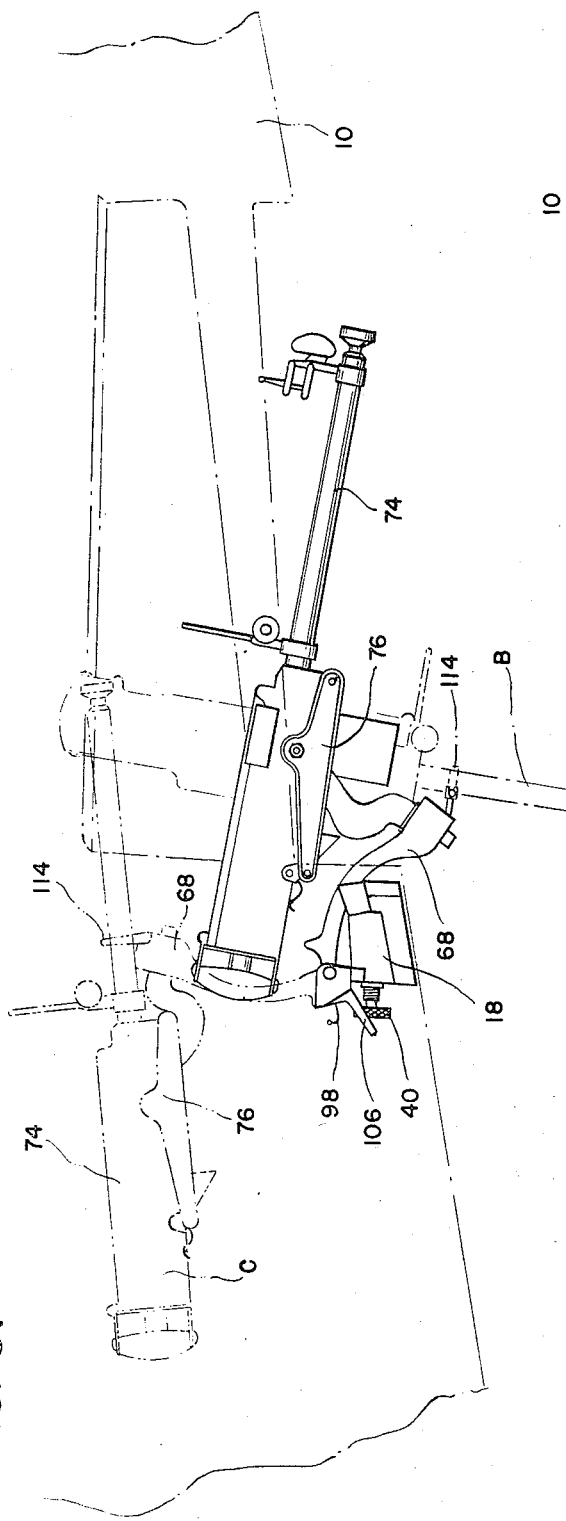
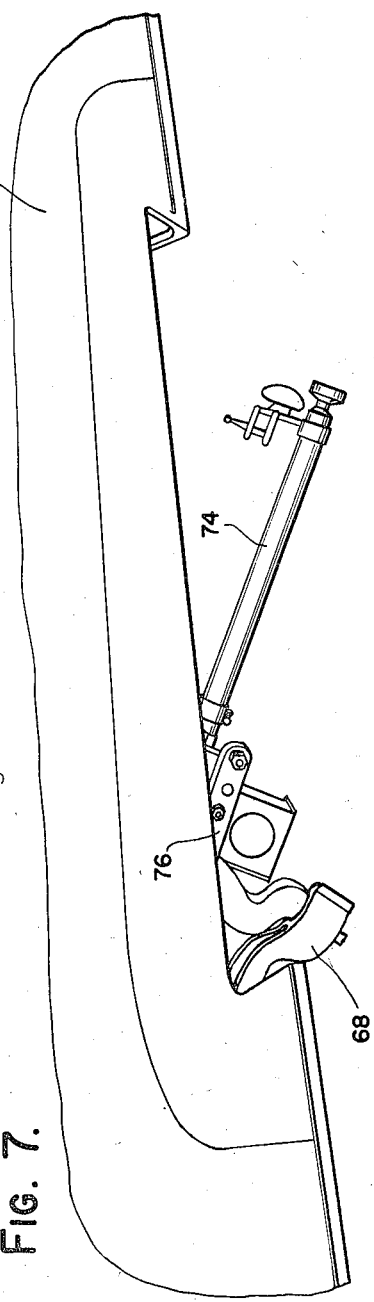

Patented July 18, 1944

2,354,114

UNITED STATES PATENT OFFICE 2,354,114

AIRCRAFT GUN INSTALLATION

Henry K. Growald, San Diego, Calif., assignor to Consolidated Vultee Aircraft Corporation, a corporation of Delaware Application March 4, 1941, Serial No. 381,622

14 Claims. (Cl. 89—37.5)

The present invention relates to gun mounts and more particularly to gun mounts which are retractable from a fixed firing position to a remotely located stowing position.

In certain aircraft, of which flying boats are a convenient example, it is necessary at times to have certain expanses of the external surface completely watertight and as nearly homogeneous from the structural standpoint as possible. Yet in military aircraft of this type it is also urgently necessary at times to be able to defend the craft by means of a gun operated in a direction that would ordinarily be a blind region caused by such surfaces. As aircraft are at present designed it is not usually possible to control by gunfire all of the region surrounding an aircraft from two or three gun positions and hence in flying boats it even becomes necessary to provide gun positions in the hull below the water line. As long as the craft remains in the air, guns may be mounted to project through openings provided in the hull in instant readiness for use against any enemy encountered but when a landing on the surface of a body of water is to be attempted, the guns must be withdrawn into the hull and each opening closed and rendered watertight by means structurally sufficient to withstand the shock of impact at landing as well as the subsequent buoyant forces exerted by the water.

Such openings in the hulls of flying boats would be on or adjacent to the fore and aft line of communication through the aircraft interior and it is therefore imperative that the gun installation be such as not to interfere with such communication. Furthermore, these openings through the hull might be alternately employed for such other purposes as the taking of navigation observations, bomb sighting, aerial photography, bomb dropping and dropping of supplies to expeditionary forces. It may therefore be recognized as desirable that any part of the gun installation fixed adjacent to the opening should interfere as little as possible with such activities as above enumerated.

With these considerations in mind, it is evident that a gun mount that would allow its associated gun to be readily moved from the firing position to a stowing position, more or less remotely located with respect to the gun opening, would be eminently desirable. Accordingly, it is a principal object of this invention to provide a retractable gun mount readily detachable from a fixed firing position and movable to a remotely located stowing position.

It is a further object to provide a mount as already described which at all times remains positively attached to the aircraft so that there is no danger of the heavy gun being dropped overboard while being moved to or from the stowed position. Another characteristic provision of the invention is the organization of the gun mount structure to pivotally support and guide the gun between its firing and stowed positions.

Additional objects are to provide locking means to hold the gun releasably fixed in both its firing and stowed positions, to provide water-tight closure means for the gun opening and to provide a universal fixed base member adjacent to each hull opening adapted to receive a gun mount and provide a rigid firing base therefor, or alternately to mount such instruments as aerial cameras, drift sights and similar devices.

In accomplishing these objects the invention has been embodied in certain structural arrangements, the details of which may be readily understood by reference to the annexed specification read in connection with the drawings, in which:

Fig. 2 is a rear elevation showing part of the gun mount proper;

Fig. 3 is a cross-section taken on the line 3—3 of Fig. 2;

Fig. 4 is a partial cross-section on the line 4—4 of Fig. 2;

Fig. 5 is a further detail of the structure shown in Fig. 4;

Fig. 6 is a side elevation of the gun mount showing the gun and mounting stirrup in various positions; and Fig. 7 is an external view of a small portion of a flying boat hull showing parts of a gun and its mount in firing position.

Figure 1:
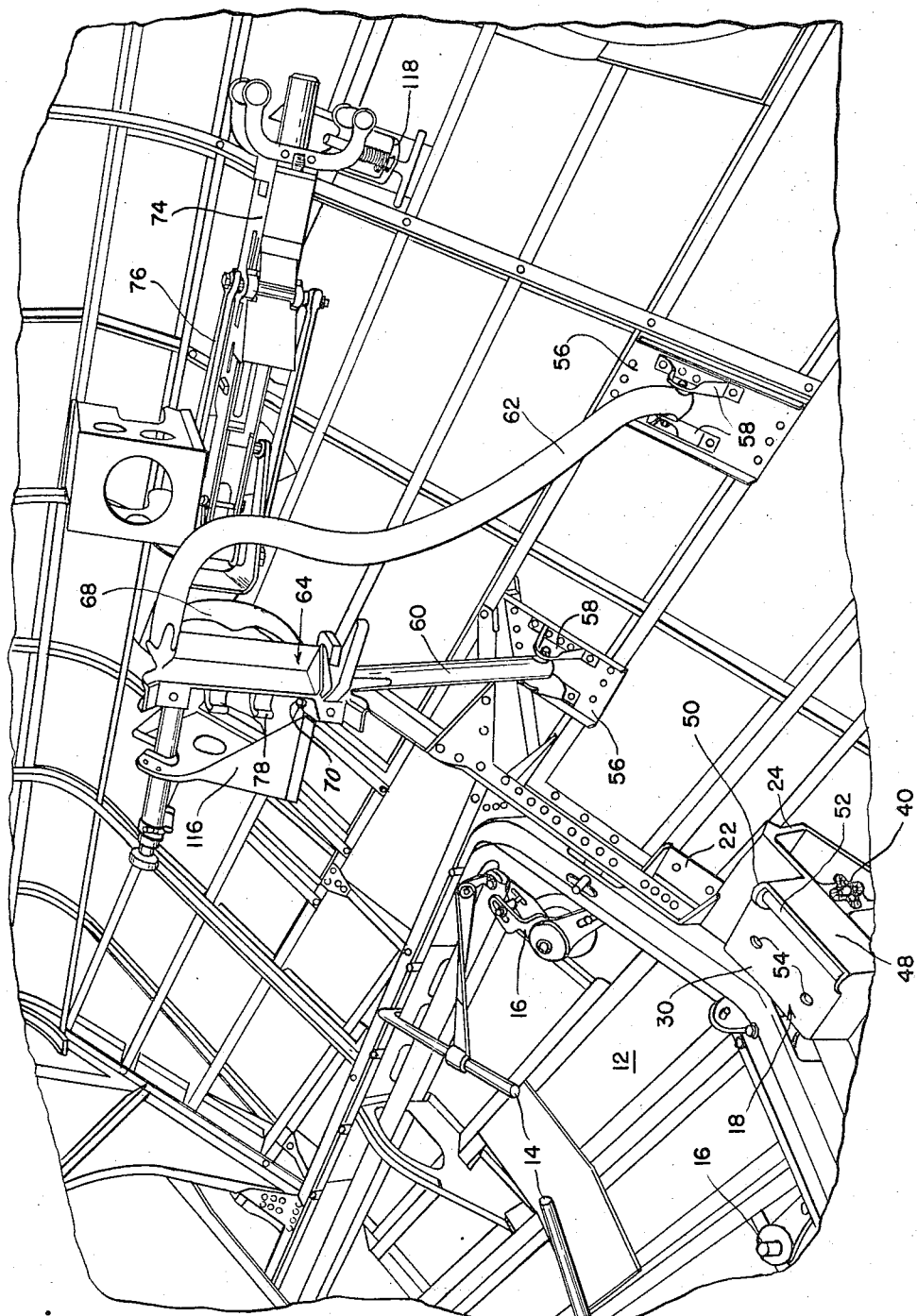
Fig. 1 is an interior view of a portion of an aircraft hull showing the components of the gun installation in assembled relationship.

The layout of the gun installation is best shown in Fig. 1 which represents an interior view of a portion of the aft part of a flying boat hull 10. In the lower, left-hand portion of the figure is shown a hingedly mounted door or closure 12 which when unlocked and swung inward on its hinges uncovers an opening through the hull bottom. Locking of the closure 12 is accomplished by means of levers 14 actuating lock mechanism in part shown at 16. Such mechanism is mounted on the structure of the closure so that in locked position heavy bolts are projected into the adjacent hull framings to enable the closed door to act as part of the hull structure. The closure is also organized to cooperate with the framing surrounding the opening to form a watertight joint therewith in any manner now well known in the art.

Fixed to the framing of the opening, preferably on the side thereof remote from the hinges of the closure, is a base member 18 best shown in Figs. 2 and 3. This base member is constructed as a hollow casting so as to be as light in weight as possible and yet be of sufficient ruggedness to serve as a firing base for a gun. It is also characterized by a V-shaped bottom formation as shown at 20. This is necessary in the installation shown to enable the base to be mounted in the bottom of the V-shaped hull in contact with the heavier structure along the keel line. Suitable means are provided to anchor the base member to this structure and to the reinforcing structure outlining the hull opening. For this purpose, reinforced plates 22 extend outward from each side of the base member 18 and these can be riveted or otherwise fastened to transverse members on which they seat.

Extending upward from the V-bottom 20 are integral side plates 24 and front and rear integral webs 26 and 28 all of which merge into the flat top 30 of the base member. Both webs are characterized by bulbous offset portions 32 and 34 for supporting a threaded spindle 36, the purpose of which will appear later. Both bulbous portions are centrally pierced by circular bores of which the one in the portion 32 is internally threaded to receive a correspondingly threaded portion 38 of the spindle 36. The projecting end of this spindle is fitted with a hand knob 40 by means of which it may be rotated. Such rotation by reason of the threaded interengagement with the base member causes axial movement of the spindle with respect thereto. In order to prevent complete removal of the spindle from the base member, a lock collar 42 is slipped thereon and partially run onto the threaded portion 38. Furthermore, in order to prevent the spindle from turning as the result of vibration, a coil spring 44 is mounted concentrically thereon to abut between a washer 46 and the face of web 32.

Disposed centrally and extending upward from the front edge of the top surface 30 is an integrally formed flat plate 48 bounded at its ends by rearwardly extending brackets 50 also formed integrally as a part of the base member. Extending between these side brackets is a rod 52, the purpose of which will also appear later. The top surface 30 may be pierced by suitable apertures 54 as shown in Fig. 1 to allow attachment of a drift sight or any other portable instrument prior to making use of such instrument.

Considering now the gun mount proper as depicted in Fig. 1 where it is shown in retracted position, it may be seen to consist of a pivoted frame which may be substantially V-shaped in formation and which is mounted on a pair of pivot plates 56 disposed in alignment off to one side of the aircraft with respect to the fixed base member 18. These plates bridge adjacent stringers of the hull framing to which they are riveted. Each plate is fitted with a pair of spaced brackets 58 between each pair of which extends a pivot pin on which is mounted a tubular arm 60 or 62 both of which taken together comprise the swinging frame or V-shaped brace of the gun mount. The otherwise free ends of these arms are joined to and carry a gun mount member 64 of peculiar formation. As best shown in Figs. 3 to 5, this member 64 has the forked ends 66 of a pivotally mounted gun stirrup 68 pivotally attached thereto by means of pivot pins 70 as shown in Fig. 4. The stirrup carries at its free end a gun socket adapter 72 of standard type by means of which the gun 74 of Fig. 1 is attached to the stirrup through the intermediacy of a conventional gun cradle 76 in which it is trunnioned.

Since the gun mount member 64 is mounted on the swinging frame composed of the arms 60 and 62 it is thereby adapted to be bodily swung through a limited arc of movement. Thus this feature is employed to swing the member 64 from the retracted position of Fig. 1 down to a gun firing position where member 64 embraces and is releasably locked to the upper portions of the base member 18. This locked relationship is illustrated in Figs. 2 and 3. When in this relationship the member 64 is seated on the base member in close engagement with the flat side 48 of the base element.

In order to lock the member 64 to the base 18, the stirrup 68 is swung down from an approximately vertical position to the position shown in Fig. 3 whereby two hook members 78 are forced to slide under the rod 52 in close contact therewith. As long as the stirrup remains down in the position shown the hooks effectively prevent any movement between or separation of the gun mount member 64 from the base 18. The hooks 78 constitute integral projections extending from a cross member 80 running between the fork arms 66 of the stirrup as shown. During firing or other manipulation of the gun, the stirrup might move upwardly on its pivots 70 and since this is undesired, means are provided to lock the stirrup against such pivotal movement. This means includes the spindle 36 previously described which when rotated in a clockwise direction by means of the hand knob 40, projects its tapered end 82 out of the opening shown in the enlarged portion 34 of the web 28, and into a correspondingly tapered aperture in a collar 84 threaded into an opening 86 in the neck of the stirrup 68.

Abutment screws 88 (see Fig. 4) are provided to extend through thickened portions of the base top 30 and to lock the screws against loosening, members 90 are provided. The purpose of the screws 88 is to provide fixed points to be contacted by the stirrup arms 66. Thus additional contact with the base member 18 is established and alignment of the opening in collar 84 with the spindle 36 is always attained after the proper initial adjustment of the screws 88 has been made.

The gun mount cannot be retracted until the spindle has been withdrawn from the collar 84 and the stirrup swung up to the approximately vertical position shown fully in position C of Fig. 6. This attitude is also indicated in Fig. 4 for the purpose of illustrating the means adopted to retain the stirrup 68 in this attitude while being retracted and during stowage. The crossbar 80 extends upwardly above the level of the fork arms 66 in the triangular formation shown. At the section 4—4 of this triangular formation, its back face has an indentation 92 below a bulbous overhang 94. With the stirrup in the vertical position, the front face of the triangular portion of crossbar 80 rests on the horizontal shelf 96 formed by part of the gun mount member 64. In this position, the parts 80 and 96 can be locked together by a spring strap 98 formed with a curved and beaded end 100 receivable in complementary relationship in the indentation 92. At its opposite end, this strap is pivotally attached, as at 102, between the bifurcated end 104 of a lever 106. The lever is pivotally mounted at 108 between spaced brackets 110 and 112 integral with the gun mount member 64. With the strap end 102 in the indentation 92, the lever 106 may be depressed past the dead center position until it reaches the position shown in Fig. 4. In this position the lever is retained by the tension of the spring 98 due to the particular arrangement of the pivots. The application of manual force, however, can easily release the lock.

Returning again to the showing of Fig. 6, it may be seen that when the gun stirrup is swung to the vertical position, the gun can at the same time be maintained in the substantially horizontal attitude designated C by proper pivotation of its cradle 76. Prior to swinging to the stowed position the gun can be locked in this attitude by a strap 114 pivotally attached to the end of stirrup 68 and adapted to be locked around the gun barrel.

With the gun so locked to the stirrup the whole assemblage can be swung directly to the stowed position shown in Fig. 4, the gun barrel slipped into the hook support 116 and the spade grip locked to the hull by means of the spring pressed bolt latch 118. When this has been accomplished the door 12 can then be swung down and locked in the hull opening.

While this invention has been described in detail in its present preferred embodiment, it will be obvious to those skilled in the art, that various changes or modifications may be made therein without departing from the teachings thereof. It is intended to cover all such modifications and changes in the appended claims.

I claim:

1. A retractable gun mount comprising a base member and a bodily swingable gun carrying structure including a pivotally attached gun stirrup, means acting upon said gun stirrup to releasably lock said gun carrying structure to said base member and alternate lock means carried by the said structure and engageable to lock said stirrup out of engagement with the base member.

2. A retractable gun mount including a substantially V-shaped brace mounted for pivotal swinging, a gun carrying stirrup pivotally attached thereto, a base member disposed to be engageable by a portion of said brace, hook members carried by said stirrup adapted to embrace a portion of said base member, lock means mounted on said base member adapted to lock said stirrup in gun firing position and second lock means attached to said brace to lock the stirrup against pivotal movement with respect thereto with said hook members disengaged from the base.

3. In an aircraft, a retractable gun mount including a substantially V-shaped brace mounted for pivotal swinging within said aircraft, a base member fixed to the structure of the aircraft at a gun firing position to be engageable by said brace, means adapted to lock said brace to said base, a gun stirrup pivotally attached to said brace, a gun mounted on said stirrup, second means adapted to lock said stirrup in a pivoted position substantially at right angles to the upper surface of said base and third means disposed in said aircraft to receive and lock said gun when pivoted with said brace to a position remote from said base.

4. In an aircraft, the combination of a gun emplacement consisting of a base member disposed adjacent an opening through which a gun may be projected for firing, a gun mount comprising a swingable structure pivotally attached to said aircraft at a position remote from said opening, a gun stirrup pivotally attached to said structure and a gun including a mounting cradle carried by said stirrup, the said swingable structure and stirrup being organized to convey the gun from a remote position to a fixed engagement on said base with the gun projecting through said opening.

5. In an aircraft, the combination of a gun emplacement including a base member, lock means carried by said member, a gun mount structure adapted to seat on said base member in locked relationship with said means, extensions projecting from said gun mount structure and pivot means attaching the end of said extensions to said aircraft at points spaced from said base member.

6. In an aircraft, the combination of a gun emplacement including a base member having an exposed rod extending transversely thereacross, a gun mount structure adapted to seat on said base, a gun stirrup pivotally attached thereto having members movable with said stirrup to embrace said rod, and lock means reciprocably movable in said base to engage said stirrup.

7. In an aircraft, the combination of a gun emplacement including a base member having an exposed rod extending transversely thereacross, a gun mount structure, pivot means mounting said structure on said aircraft for swinging from contact with said base member to a stowing position, a gun stirrup pivotally attached to said structure, members carried by said stirrup movable therewith to engage said rod and means to lock said stirrup and members against pivotation to prevent engagement with said rod.

8. In a gun emplacement in a flying boat hull, the combination of a gun opening, a gun projectible through said opening, a gun mount for the support of said gun including a fixed base member disposed adjacent the opening, means to lock said gun to said member for firing purposes, a supporting frame for said gun mount pivotally attached to the hull structure at a position displaced from the opening and adapted to swing the gun out of said opening to a position remote therefrom and a closure organized to be moved into said opening in watertight relation with the flying boat hull.

9. A gun installation including a retractable gun mount disposed in the vicinity of an opening through which a gun may be projected for firing, a closure organized for movement into said opening, a base member mounted adjacent the edge of said opening, a gun carrying structure swingable into engagement with said base member, the said structure including a pivotally attached gun stirrup, means adapted to lock said stirrup to said base member with the gun projecting through the opening and alternate means to lock the stirrup out of engagement with the base member to permit operation of said closure without interference with the said gun.

10. In a gun emplacement, the combination of a base member, a movable gun mount structure adapted to seat on said base, a gun stirrup pivotally attached to said structure having members movable with said stirrup to engage a suitable portion of said base member, and lock means operable in said base member to prevent pivotation of said stirrup.

11. In an aircraft gun emplacement, a base member fixed to the aircraft structure, a gun mount carried by the structure and attached to the aircraft on a pivotal axis displaced from said base member and swingable through an arc to seat said gun mount on said base member, a gun carrying stirrup pivoted to and forming a part of said gun mount and means adapted to lock the gun mount to the base member, said means comprising members carried by the stirrup engageable with the base member on pivotal movement of said stirrup and a locking device operable to prevent pivotal movement of the stirrup in the direction to cause disengagement of said members.

12. In an aircraft gun emplacement, a base member fixed to the aircraft structure, a gun mount including a pivotally attached stirrup, a frame structure carrying said gun mount attached to the aircraft on a pivotal axis displaced from the said base member for pivotation to place the gun mount in contact with said base member, means carried by the gun mount for locking engagement with said base member and second lock means adapted to fix the pivotal attitude of the stirrup with respect to the base member.

13. In a gun emplacement in a flying boat hull having an opening disposed on the line of fore and aft communication through the hull, a base member fixed to the hull structure at the edge of the opening, a gun provided for firing through said opening from rigid support on said base, a structure attached to the interior of said hull by pivotal attachment means offset from the line of communication, a mount supporting the said gun on the structure, the said structure being adapted by its mounting to swing into or out of the line of communication with consequent disposition of the gun mount in contact with the base or in a remote stowing position and means adapted to lock the gun mount in its alternate positions.

14. In a gun emplacement in a flying boat hull having an opening disposed on the line of fore and aft communication through the hull and an operable closure fitted to the opening for movement into watertight relationship therewith, a base member fixed to the hull structure at the edge of the opening, a gun provided for firing through said opening from rigid support on said base, a structure attached to the interior of said hull by pivotal attachment means offset from the line of communication, a mount supporting the said gun on the structure, the said structure being adapted by its mounting to swing the gun from a remote position into the line of communication with consequent disposition of the gun mount in contact with the base, the said gun mount including a gun-carrying stirrup pivotally attached thereto for movement of the gun into or out of the said opening when the mount is in contact with the base to prevent interference of the gun with the operation of the said closure and means adapted to lock the gun in its alternate positions.

HENRY K. GROWALD.